May 12, 1964   D. M. WALKER   3,132,580
AUTOMATIC TEA MAKER
Filed June 11, 1962   3 Sheets-Sheet 2

INVENTOR.
Dorothy Walker

May 12, 1964 D. M. WALKER 3,132,580
AUTOMATIC TEA MAKER
Filed June 11, 1962 3 Sheets-Sheet 3
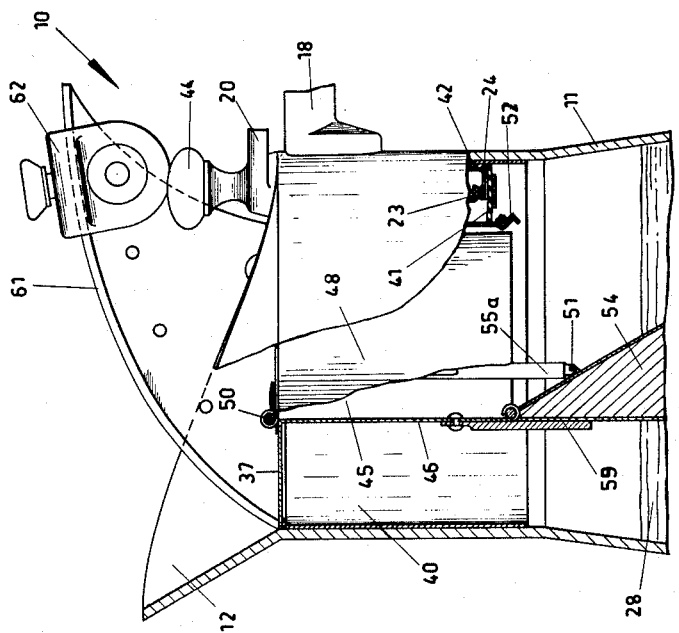
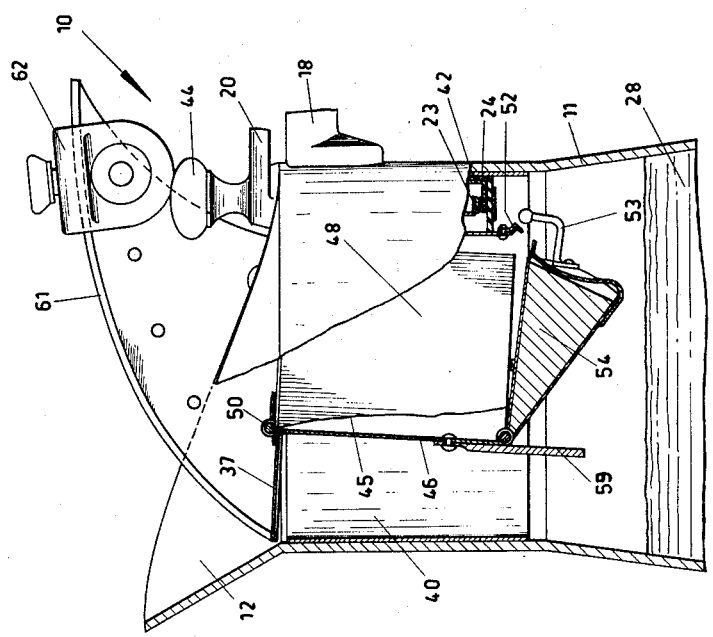
INVENTOR.
Dorothy Walker

United States Patent Office 3,132,580
Patented May 12, 1964

3,132,580
AUTOMATIC TEA MAKER
Dorothy M. Walker, Toronto, Ontario, Canada
(11 Pleasant Home Blvd., Downsview, Ontario, Canada)
Filed June 11, 1962, Ser. No. 202,643
10 Claims. (Cl. 99—282)

This invention relates to improvements in culinary utensils, more particularly, to improvements in tea pots.

It is well known that, in order to make a correctly brewed pot of tea it is essential that the dry tea leaves be added to the water, or vice versa, upon the latter reaching boiling point. It is also essential, however, that the water does not continue to boil during the infusion period or the tea becomes stewed and bitter tasting. Due to these requirements, it is conventional practice to utilize a tea pot into which the dry tea is placed, the water being boiled in a separate container and then poured onto the dry tea. It is necessary, therefore, that a person making tea keep the kettle or the like under observation to prevent the water from boiling away and it should be noted that the complete operation is somewhat time consuming and requires the use of two separate vessels. Furthermore, it is often the case that tea is made with water that has not reached boiling point such a beverage being also somewhat unpalatable.

From the foregoing it will be obvious that conventional automatic coffee makers are not suitable for making tea as it is essential that the dry tea and the water be kept separate right up to the time that the water boils.

It is, therefore, an object of the present invention to provide an automatic tea maker which will maintain the dry tea out of contact with the water until the water boils.

It is another object of the present invention to provide an automatic tea maker which will add the dry tea to the water upon the water reaching boiling point.

It is still another object of this invention to provide an automatic tea maker which will cut off the supply of heat to the tea pot immediately upon the tea being added to the water.

It is a further object of this invention to provide an automatic tea maker which will indicate when the boiling has been completed and the tea is being brewed or steeped.

It is still another object of this invention to provide an automatic tea maker in which the boiling temperature of the water may be predetermined and set.

It is a further object of the invention to provide an automatic tea maker which will permit the tea to be poured therefrom and, upon assuming the upright position, will again seal the container to prevent heat loss.

It is another object of this invention to provide an automatic tea maker with an automatic resetting mechanism.

It is yet a further object of this invention to provide an automatic tea maker, the functional portions of which may be removed to facilitate cleaning of the container portion.

These and other objects and features of this invention will become apparent when taken in conjunction with the accompanying drawings in which:

FIG. 3 is a fractional, part sectional, side elevation of the upper end of the tea maker showing its release mechanism being actuated by steam pressure.

FIG. 4 is a view similar to FIG. 3, illustrating the mechanism after it has been fully actuated.

Figure 1:
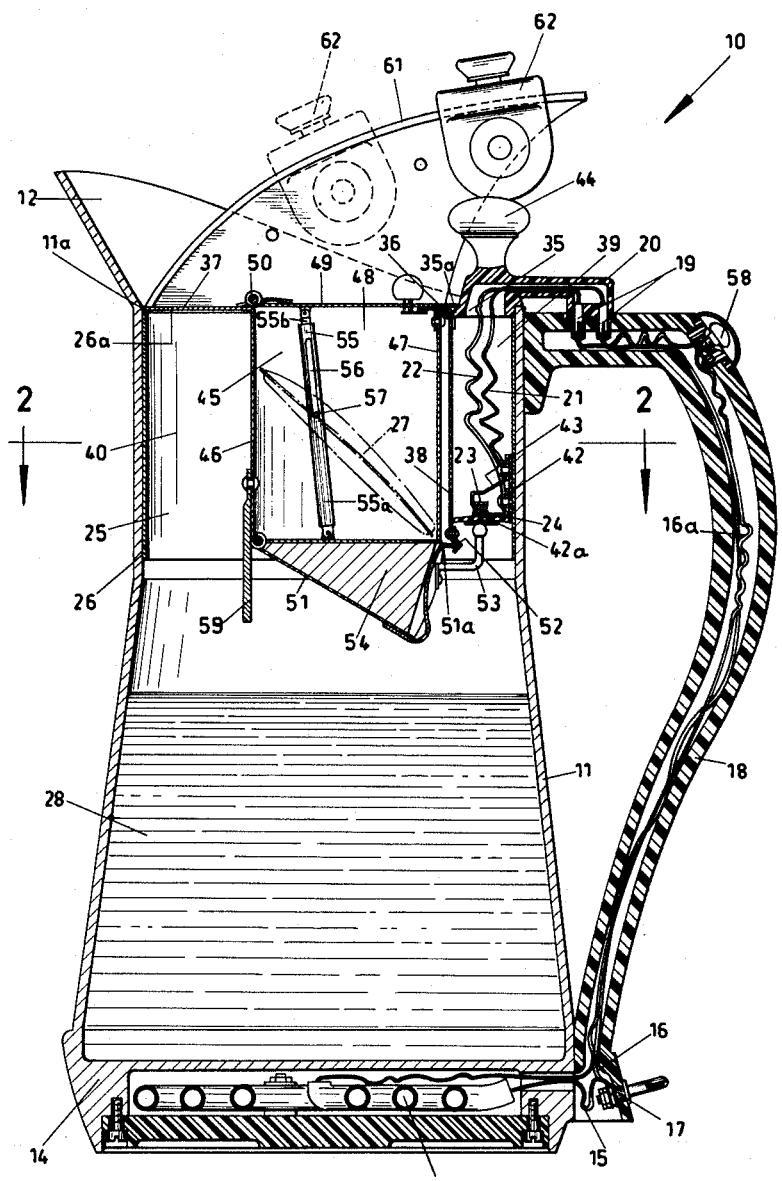
FIG. 1 is a sectional side elevation of an automatic tea maker embodying the present invention.
Figure 2:
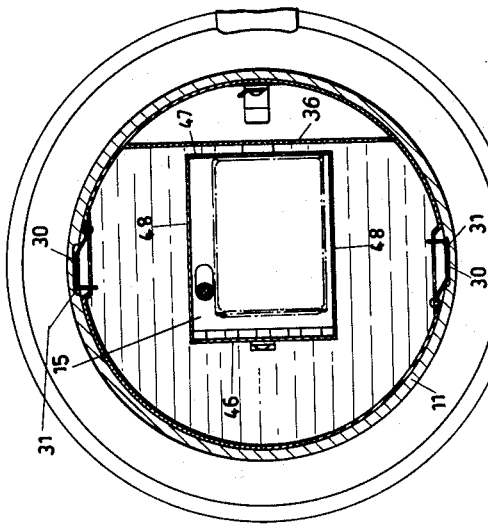
FIG. 2 is a sectional plan view of the tea maker illustrated in FIG. 1, taken on the line 2—2.

Referring to FIGS. 1 and 2, an automatic tea maker 10 includes a container 11 of elongated tubular configuration having an ungulate shaped pouring spout 12 extending upwardly and outwardly from the upper edge 11a thereof.

A heating element 13 is located in the base 14 of container 11, being supplied with electrical power from two wires 15 and 16 from a conventional two pin male plug 17.

A hollow handle member 18 extends the height of container 11, being attached thereto at the lower end adjacent male plug 17, and at the upper end diametrically opposite the pouring spout 12. Handle 18 is of preferably dielectric material and wire 16 is adapted to run internally thereof to the upper end 18a in connecting one pin of socket 17 with heating element 13. Wire 16, therefore, forms a loop 16a within handle 18 and is divided at the upper end to form a pair of female receptacles 19—19 adapted to receive a mating two pin plug 20.

Two wires 21 and 22 extending from plug 20 complete a circuit which includes wire 16, wires 21 and 22 being connected by means of two contact points 23 and 24 respectively.

An operating mechanism 25 contained within an outer housing 26 is principally adapted to permit a tea bag 27 or the like to be dropped into container 11 upon water 28 within container 11 reaching boiling point and, at the same time, break the circuit through wire 16, thereby switching off element 13 and preventing further boiling of water 28.

Housing 26 is tubular and is adapted to be a close sliding fit in the upper portion of container 11 and retained therein by conventional spring fastener mechanisms 30 cooperable with arcuate slots 31 formed in the side walls of container 11 as illustrated particularly in FIG. 2.

In the following description, container 11 and housing 26 will be assumed to be circular in section, but this is not in any way intended to limit the scope of the invention.

An upper wall 35 extends across a minor segment of the upper end of housing 26 the latter being so disposed within container 11 that upper wall 35 is adjacent to and equally disposed about the upper end of handle 18.

A hinge 36 extends across the inner, chordal edge 35a of wall 35 and supports a lid member 37 which covers the remaining major chordal portion of the upper end of housing 26. Lid 37 is adapted to rest in substantially vapor-tight relation on the upper edge 26a of housing 26, so that, in combination with upper wall 35, the upper end of housing 26 is completely closed.

A rigid, vertical wall 38 extends downwardly from edge 35a of upper wall 35 to divide the interior of housing 26 into a small rear compartment 39 and a large front compartment 40.

A flexible diaphragm 41 extends across the lower end of rear compartment 39, thereby completely sealing it from the interior of container 11. A leaf spring 42 having one end attached to, but insulated from the side wall of housing 26 is adapted to have its free end 42a rest on the upper surface of diaphragm 41 and bias the latter downwardly.

Free end 42a is also adapted to carry what may now be defined as lower contact point 24. Contact point 23, is therefore, uppermost and held in a fixed position above contact point 24 by an arm 43 which is also rigidly attached to and insulated from the side wall of housing 26. Wires 21 and 22 are connected to their contact points 23 and 24 through arm 43 and spring 42 respectively.

A knob-like handle 44 is attached to upper wall 35 to permit ease of insertion and removal of mechanism 25 within container 11 and is integral with electrical plug 20 so that insertion of mechanism 25 into container 11 results in plug 20 mating with receptacles 19 and, conversely, removal of mechanism 25 from container 11 also detaches plug 20 from receptacles 19, thereby disrupting the circuit through wire 16 and preventing inadvertent operation of heater 13 when mechanism 25 is removed from container 11

A tea bag receptacle 45 extends downwardly from the undersurface of lid 37 and is defined by a front wall 46, a rear wall 47 and side walls 48—48. Lid 37 is suitably apertured to permit access to receptacle 45 from the top and a receptacle lid 49 is attached to lid 37 adjacent front wall 46 by spring hinge means 50 biasing lid 49 into vapor tight contact with lid 37. A small knob and catch assembly adjacent the rear edge of lid 49 permits the latter to be secured in its closed position and, when required, provides the means for raising it.

A trap door 51 is hingedly attached to the lower edge of front wall 46 of receptacle 45 and, in its raised position, is adapted to seal off the lower end of receptacle 45. Trap door 51 is retained in its upper position by means of its rear edge 51a continuing rearwardly to a position adjacent the lower edge of vertical wall 38 as described. A rebent spring clip 52 attached to wall 38 cooperates with edge 51a in holding trap door 51 in position.

It should be noted that rear wall 47 of receptacle 45 is located closely parallel to dividing wall 38, both of said walls being downwardly coextensive.

A striker pin 53 extends rearwardly from trap door 51 and is bent upwardly to contact the undersurface of diaphragm 41 so that, upon trap door 51 being in its raised position as illustrated in FIG. 1, pin 53 overcomes the downward pressure of leaf spring 42 and thereby holds lower contact point 24 in full contact with upper contact point 23 to complete the electrical circuit through wire 16. Diaphragm 41, is of course, suitably reinforced and sufficiently flexible to permit a number of such operations indefinitely.

To ensure absolutely positive action, trap door 51 is heavily weighted, a weight 54 being attached to the underside thereof. A stop member 59 extends downwardly from front wall 46 of receptacle 45 and is adapted to limit the arcuate downward travel of weight 54 and, therefore, of trap door 51.

A telescopic rod 55 extends between lid 49 and trap door 51, being hingedly attached to both, and comprises an outer component 55a and an inner component 55b. A longitudinal slot 56 in outer component 55a is adapted to permit a stop 57 to operate therein, said stop being integral with inner component 55b. The length of slot 56 is sufficient to permit trap door 51 to fall its predetermined distance with lid 49 closed, stop 57 thereafter being in close contiguity with the upper end of slot 56 so that subsequent raising of lid 49 also raises trap door 51 through rod mechanism 55. In this manner, trap door 51 may be reset if so required merely by the raising of lid 49.

Figure 6:
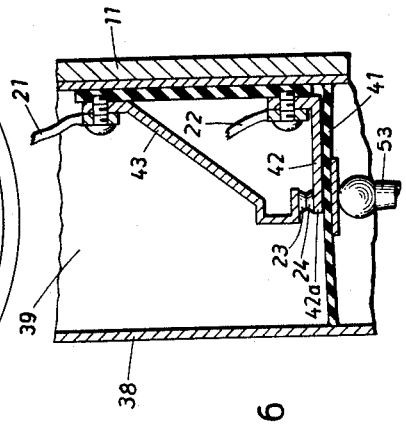
FIG. 6 is an enlarged view of the switch mechanism embodied in the present invention.

FIGS. 3 and 4 illustrate the release action of trap door 51 in greater detail. From FIGS. 1, 3 and 6 it will be seen that, with trap door 51 raised, striker pin 53 causes contact points 23 and 24 to close, and the circuit which includes wires 21 and 22 in with wire 16 is completed, permitting heating element 13 to receive power through socket 17 and so to heat water 28 within container 11. At this stage, the upper end of housing 26, and therefore, container 11 is sealed by upper wall 35 and lid 37 and, it should be noted, weight 54 acting through its hinged connection with receptacle 45, is also instrumental in causing pressural contact between lid 37 and housing 26. Lid 49 of receptacle 45 is also sealed and locked in position.

Thus, upon water 28 boiling, vapor pressure is generated within housing 26, acting upwardly upon lid 37 and upon becoming sufficiently great to overcome the downward forces on lid 37, causes the latter to move arcuately upwardly above its hinge 36.

Receptacle 45, being attached to lid 37, also tilts, but vertical wall 38 remains stationary. Thus edge 51a of trap door 51 is caused to move away from spring clip 52 and, upon becoming disengaged, is caused to drop immediately under influence of weight 54.

This action permits tea bag 27, which has previously been placed in receptacle 45, to drop into the boiling water 28. The dropping of trap door 51 also removes striker pin 53 from diaphragm 41 and leaf spring 42 is able to extend downwardly, breaking contact between points 23 and 24, thereby breaking the circuit to heater 13 and water 28 ceases to boil. Relief of vapor pressure from container 11 and housing 26 permits lid 37 to return to its seating so that container 11 is sealed against heat loss during the steeping period.

An indicator lamp 58 may be embodied in handle 18 and wired in parallel with the receptacle 19 so that, upon heater 13 ceasing to draw a full current load, lamp 58 is illuminated to indicate the fact that the tea bag 27 is in water 28.

The boiling temperature of water 28 is affected by the vapor pressure above it, which, in turn, is controlled by the weight acting on lid 37 to keep it closed. To provide a pressure relief adjustment, and, therefore, an adjustment to the boiling point of water 28, an extension arm 61, integral with lid 37 carrying a weight 62 slidably thereon, is provided. Suitable stop means, such as spring loaded balls or a releasable plunger or the like, incorporated in weight 62 enables the position of weight 62 to be adjusted on arm 61 so that the resultant relief pressure may be accurately determined and so indicated upon arm 61, preferably in temperatures, which are more readily understood by the general public.

It should be noted that, with trap door 51 in its closed position, most of weight 54 is supported by clip 52 and only a small portion of it acts through front wall 46 of receptacle 45 to exert a downward pressure on lid 37.

Figure 5:
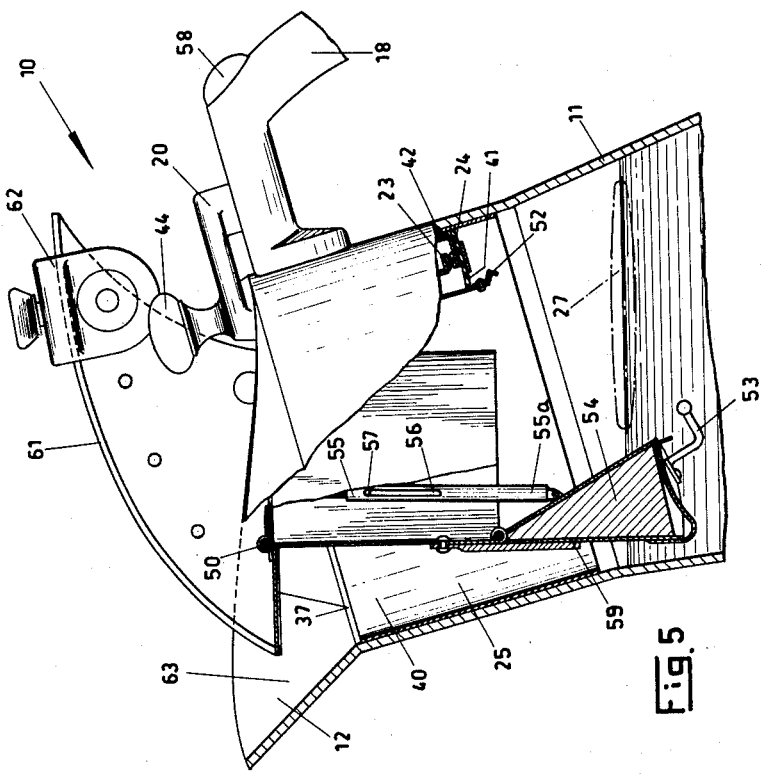
FIG. 5 is a view similar to FIG. 4 illustrating particularly the beginning of the pouring operation.

Release of trap door 51, however, as previously described, causes the whole of weight 54 to be applied to lid 37 through wall 46. As shown in FIG. 5, the tilting of container 11 in a pouring action permits weight 54 to move to a location vertically below hinge 36. This is lowest position which it is able to assume relative to the remainder of device 10, so that further tilting of container 11 effects a rotation thereof about hinge 36 and results in upper edge 11a of container 11 moving away from lid 37 which from this point on, remains static, being integral with front wall 46 and weight 54.

The total liquid capacity of container 11 is such that, when full, the liquid is at the juncture of upper edge 11a and pouring spout 12 at, or subsequent to, the parting of lid 37 from edge 11a to prevent any dam effect prior to the opening of lid 37.

It should also be noted that, due to the presence of stop 59, the hinge action of weight 54 on wall 46 is prevented during the pouring action and lid 37 reaches its open position earlier than it would if weight 54 were unrestricted in movement.

When the pouring action is completed, container 11 resumes the upright position and lid 37 is again held in weighted, sealed contact with the upper edge 26a of housing 26, thereby retaining the maximum amount of heat in container 11 and the liquid tea contained therein.

The general design of the individual parts of the invention as explained above may be varied according to requirements in regards to manufacture and production thereof, while still remaining within the spirit and principle of the invention, without prejudicing the novelty thereof.

The embodiments of this invention in which an exclusive property or privilege is claimed are defined as follows:

1. An automatic tea maker including a container for fluids; said container having an open upper end; means for heating said fluids; lid means hingedly attached to said container extending fully over said open end in substantially vapour tight contact therewith; a receptacle within said container depending from said lid means; a trap door forming a bottom wall of said receptacle and hingedly attached thereto at one edge thereof; releasable catch means cooperable with a second edge of said trap door to retain said trap door in an upper position; said catch means being released upon said lid and said receptacle being moved arcuately upwardly to permit said trap door to fall arcuately to a lower position; said receptacle having an upper access hole through said lid; receptacle lid means for closing said access hole; and means for raising said trap door to its upper position upon said lid resting upon said open end of said container.

2. An automatic tea maker as defined in claim 1 in which said heating means is an electrical element; and including electrical switch means operable by said trap door, said switch means being closed by said trap door upon the latter being held in said upper position by said catch means.

3. An automatic tea maker including a container for fluids, said container having an open upper end; electrical heating means attached to said container; first and second electrical wires for connecting said heating means to a source of electricity; a hollow handle for said container; said first wire extending through said handle in a loop; the upper end of said loop being severed to form two ends; each of said ends embodying a female socket; a substantially vertical wall within said container defining a compartment; a flexible diaphragm extending across the lower end of said compartment; contact switch means within said compartment; electrical plug means and wire means connecting said switch with said female sockets; lid means hingedly attached to the upper edge of said vertical wall and extending over the remainder of said open end in substantially vapour-tight contact therewith; a receptacle within said container depending from said lid; a trap door forming a bottom wall for said receptacle; said trap door being hingedly attached at one edge to said receptacle; catch means attached to said vertical wall for the releasable retention of a second edge of said trap door upon the latter being in its uppermost closed position; said lid moving arcuately upwardly causing said receptacle to move and said second edge of said trap door to become free of said catch and fall arcuately downwardly; a striker pin attached to said trap door, contacting said diaphragm and closing said contact switch upon said trap door assuming its closed position; said switch being resiliently biased into the open position and automatically opening upon said striker pin being removed from said diaphragm by the downward movement of said trap door; sealable access means through said lid into said receptacle and means interconnecting said trap door and said access means permitting said trap door to be raised to its closed position by an opening action of said access means.

4. An automatic tea maker including a container for fluids, said container having an open upper end; electrical heating means attached to said container; first and second electrical wires for connecting said heating means to a source of electricity; a hollow handle for said container; said first wire extending through said handle in a loop; the upper end of said loop being severed to form two ends, each of said ends embodying a female socket; an outer housing having an open lower end being a close, slidable, substantially vapour tight fit in said open upper end of said container; a substantially vertical wall within said housing defining a compartment; a flexible diaphragm extending across the lower end of said compartment; contact switch means within said compartment; electrical plug and wire means connecting said switch with said female sockets; lid means hingedly attached to the upper edge of said vertical wall and extending over the remainder of the upper end of said housing in substantially vapour tight contact therewith; a receptacle within said container depending from said lid; a trap door forming a bottom wall for said receptacle; said trap door being hingedly attached at one edge to said receptacle; catch means attached to said vertical wall for the releasable retention of a second edge of said trap door upon the latter being in its uppermost, closed position; said lid moving arcuately upwardly causing said receptacle to move and said second edge of said trap door to become free of said catch and fall arcuately; a striker pin attached to said trap door, contacting said diaphragm and closing said contact switch upon said trap door assuming its closed position; said switch being resiliently biased into the open position and automatically opening upon said striker pin being removed from said diaphragm by the downward movement of said trap door; sealable access means through said lid into said receptacle and means interconnecting said trap door and said access means permitting said trap door to be raised to its closed position by an opening action of said access means.

5. An automatic tea maker as defined in claim 4 in which an ungulate shaped spout extends upwardly from said open end of said container.

6. An automatic tea maker as defined in claim 4 in which a stop member extends downwardly from said receptacle to limit the downward travel of said trap door.

7. An automatic tea maker as defined in claim 4 in which said trap door is weighted.

8. An automatic tea maker as defined in claim 4 in which a counter balance arm extends outwardly from said lid including weight means adjustably positionable thereon.

9. An automatic tea maker as defined in claim 4 including knob means integral with said outer housing to permit the removal and replacement of said housing.

10. An automatic tea maker as defined in claim 4 including spring fastener means extending resiliently outwardly from said outer housing and said container being grooved to cooperably receive said fastener.

References Cited in the file of this patent

UNITED STATES PATENTS 2,883,921    Morrison _____ Apr. 28, 1909

FOREIGN PATENTS 550,000    Germany _____ May 7, 1932
835,025    Germany _____ Mar. 27, 1952